(12) United States Patent
Lewis et al.

(10) Patent No.: US 9,216,632 B2
(45) Date of Patent: Dec. 22, 2015

(54) SLIDING/FOLDING SOFT TOP ASSEMBLY FOR SUV

(71) Applicant: Magna International Inc., Aurora (CA)

(72) Inventors: Stephen John Lewis, Harrison Township, MI (US); Florin Avram, Farmington Hills, MI (US)

(73) Assignee: Bestop, Inc., Louisville, CO (US)

( * ) Notice: Subject to any disclaimer, the term of this patent is extended or adjusted under 35 U.S.C. 154(b) by 152 days.

(21) Appl. No.: 14/053,266

(22) Filed: Oct. 14, 2013

(65) Prior Publication Data

US 2014/0103682 A1    Apr. 17, 2014

Related U.S. Application Data

(60) Provisional application No. 61/712,997, filed on Oct. 12, 2012.

(51) Int. Cl.
*B60J 7/02* (2006.01)
*B60J 7/06* (2006.01)
*B60J 7/12* (2006.01)

(52) U.S. Cl.
CPC *B60J 7/028* (2013.01); *B60J 7/061* (2013.01); *B60J 7/1239* (2013.01)

(58) Field of Classification Search
CPC ........................................................ B60J 7/061
USPC .................................................... 296/107.13
See application file for complete search history.

(56) References Cited

U.S. PATENT DOCUMENTS

| | | | |
|---|---|---|---|
| 1,272,539 A * | 7/1918 | Saunders, Jr. ............ | 296/107.13 |
| 1,298,836 A | 4/1919 | Vetter | |
| 2,076,243 A | 4/1937 | Marshall et al. | |
| 2,580,487 A * | 1/1952 | Vigmostad ................... | 296/117 |
| D259,340 S | 5/1981 | Stengel | |
| 4,600,235 A | 7/1986 | Frederick et al. | |
| 4,757,854 A | 7/1988 | Rippberger | |
| 4,850,634 A | 7/1989 | Taubitz | |
| 4,930,835 A | 6/1990 | Bruce et al. | |
| D322,055 S | 12/1991 | Bruce et al. | |
| 5,267,774 A | 12/1993 | Garner et al. | |
| 5,511,844 A | 4/1996 | Boardman | |
| 5,673,959 A | 10/1997 | Padlo | |
| 5,725,273 A | 3/1998 | Vernon et al. | |
| 5,775,767 A | 7/1998 | Harrison et al. | |
| D408,781 S | 4/1999 | Gordon | |

(Continued)

FOREIGN PATENT DOCUMENTS

DE    3416330 A1    11/1985

*Primary Examiner* — H Gutman

(74) *Attorney, Agent, or Firm* — Warn Partners, P.C.

(57) ABSTRACT

A sliding/folding soft top assembly having opposing first and second linkage assemblies with a plurality of guide rollers located within a first and second guide track for selectively moving the soft top assembly between a deployed position to a first stowed position or a retracted stowed position. A first bow and second bow are coupled to each of the first and second linkage assemblies, which include a first pivot joint for rotating the first bow to the first stowed position. A rear pivot joint allows a rear link of the first and second linkage assemblies to rotate in an area where the first and second guide tracks curve. A third bow is rotatably connected to first and second pivot brackets, and a fourth bow is pivotably connected to the third bow, to allow rotation of the third and fourth bow between the deployed position and retracted stowed position.

19 Claims, 17 Drawing Sheets

(56) References Cited

U.S. PATENT DOCUMENTS

| | | |
|---|---|---|
| 5,947,546 A | 9/1999 | Hilliard et al. |
| 6,003,936 A | 12/1999 | Gordon |
| 6,203,100 B1 | 3/2001 | Gordon |
| 6,257,647 B1 | 7/2001 | Ninness et al. |
| 6,286,888 B1 | 9/2001 | Essig |
| 6,295,713 B1 | 10/2001 | Hilliard et al. |
| 6,431,635 B2 | 8/2002 | Nicastri |
| 6,464,284 B2 | 10/2002 | Neubrand |
| 6,502,892 B2 | 1/2003 | Eberle |
| D474,145 S | 5/2003 | Dawson et al. |
| 6,578,898 B2 | 6/2003 | Rothe et al. |
| 6,582,009 B2 | 6/2003 | Wezyk et al. |
| 6,659,533 B1 | 12/2003 | Grubbs |
| 6,688,668 B2 | 2/2004 | Stevens et al. |
| 6,827,391 B1 | 12/2004 | Kohn et al. |
| 6,866,322 B2 | 3/2005 | Willard |
| 6,932,423 B2 | 8/2005 | Stevens et al. |
| 6,942,274 B2 | 9/2005 | Henning |
| 7,029,052 B2 | 4/2006 | Troeger et al. |
| 7,118,160 B2 | 10/2006 | Willarrd |
| D537,031 S | 2/2007 | Hoy et al. |
| 7,506,917 B2 | 3/2009 | Essig et al. |
| 2005/0280293 A1 | 12/2005 | MacNee, III et al. |
| 2006/0152033 A1 | 7/2006 | Schartner et al. |
| 2008/0217954 A1 | 9/2008 | Weismuller et al. |
| 2010/0109375 A1 | 5/2010 | Just et al. |

\* cited by examiner

SLIDING/FOLDING SOFT TOP ASSEMBLY FOR SUV

CROSS-REFERENCE TO RELATED APPLICATIONS

This application claims the benefit of U.S. Provisional Application No. 61/712,997, filed Oct. 12, 2012. The disclosure of the above application is incorporated herein by reference

FIELD OF THE INVENTION

The present invention relates to a frame arrangement used in a soft top roof cover assembly for a vehicle.

BACKGROUND OF THE INVENTION

Soft top roof assemblies are generally known and used for a variety of vehicles to allow an operator to selectively retract or remove all or a portion of the vehicle's roof exposing the interior passenger and/or storage spaces. Typical soft top roofs have a cover formed of one or more pieces of fabric, vinyl or other cloth type of foldable material supported by a frame.

The frame is releasably connected using semi-rigid attachment fixtures, e.g., rail retainers, plastic channels, etc, to a fixed vehicle support frame or structure formed of numerous rigid and/or semi-rigid support rails, support member(s), sport/roll bar(s), etc to form a removable or retractable vehicle roof. Additionally panels, e.g., comprising clear plastic forming windows and/or vinyl, fabric or other cloth type of foldable material, are generally releasably attached to the cover, e.g., using zippers, velcro, and/or snaps, etc.

Known frames also have pivotable members that permit the frame and the foldable material supported by the frame to be moved between a retracted and a deployed position, e.g., retracted to expose the vehicle interior, and a deployed position in which the cover prevents the interior of the vehicle from being exposed to environment. A header is attached to the cover and a pivotable linkage and is releaseably attached to the windshield frame. Generally, when header latches under the vehicle visor are released from the windshield frame by the operator, the operator can fold the header and the cover back and hold them in place with Velcro® straps. When desirable to have a partially removed roof during transit, the cover is secured in place using Velcro straps wrapped around the linkage and side bows of the vehicle along the roofline. When desirable to have a fully retracted roof, foldable frame members, including the header and linkage, are further retracted to a lowered position located rearward of passenger seating.

Generally, when the cover is in the fully retracted position and the operator desires to deploy or close the cover, the operator grasps the linkage adjacent the header on one side of the vehicle and raises a pivot point of the linkage to a location on top of the vehicle frame, usually in a location above a front quarter window frame, and snaps the linkage into a fixed locking mechanism. This locks the linkage in place relative to the front quarter window frame while allowing the linkage half having the header to be rotated by the operator to pivot the header toward the windshield frame. The header latches are engaged by the operator thereby securing the header to the windshield frame. The fully extended or deployed soft top roof assembly thereby seals off the driver/passenger/storage compartment from the environment.

While various soft top assemblies have been developed, they are difficult to operate. Soft top assemblies are particularly difficult to cycle, e.g., between a retracted and deployed position and vice versa, especially by one operator. Typically, the top frame assembly allows too much free play. The top frame and cover of the assembly also binds up on at least the vehicle side sport/roll bars making the soft top assemblies difficult to operate and control. This can also cause damage to the soft top assemblies from an operator trying to force operation of the soft top assembly.

Accordingly, there exists a need for a sliding/folding soft top assembly configured to improve ease of use and effectiveness.

SUMMARY OF THE INVENTION

The present invention is directed to a sliding/folding soft top assembly for a vehicle, preferably, for a sports utility vehicle, e.g., a two door sports utility vehicle, which can be selectively moved between a retracted stowable position and a deployed position. The sliding/folding soft top assembly of the present invention includes a first bow member or header connected to a first linkage assembly and a second linkage assembly, a first guide track coupled to the first linkage assembly, and a second guide track coupled to the second linkage assembly. A second bow member is operably coupled to the first and second linkage assemblies. A third bow member and a fourth bow member are operably coupled to a first pivot bracket and a second pivot bracket, respectively. At least the first bow, second bow, third bow, fourth bow, first and second guide tracks, first and second pivot brackets, and first and second linkage assemblies, form a frame for supporting and moving a cover of the sliding/folding soft top assembly.

When the sliding/folding soft top assembly is in the deployed position, latches on the first bow are attached to the windshield header, e.g., under the visors, of the vehicle and the cover seals off the interior of the vehicle. The first and second linkage assemblies comprise pivot joints to rotate the first bow rearward to a first stowed position where it is secured so the vehicle may be operated while in this first stowed position.

When the sliding/folding soft top assembly is moved from the first stowed position to a second or fully stowed position, the first and second linkage assemblies are slid rearward along the first and second guide tracks and the first, second, third and fourth bows are lowered to behind a storage space of the vehicle interior. As the fourth and third bows are moved rearward they freely rotate about the first and second pivot brackets into the second stowed position. In addition, as the first and second linkage assemblies are slid rearward, the first bow clears the vehicle's sport/roll bars and the first and second guide tracks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 7:
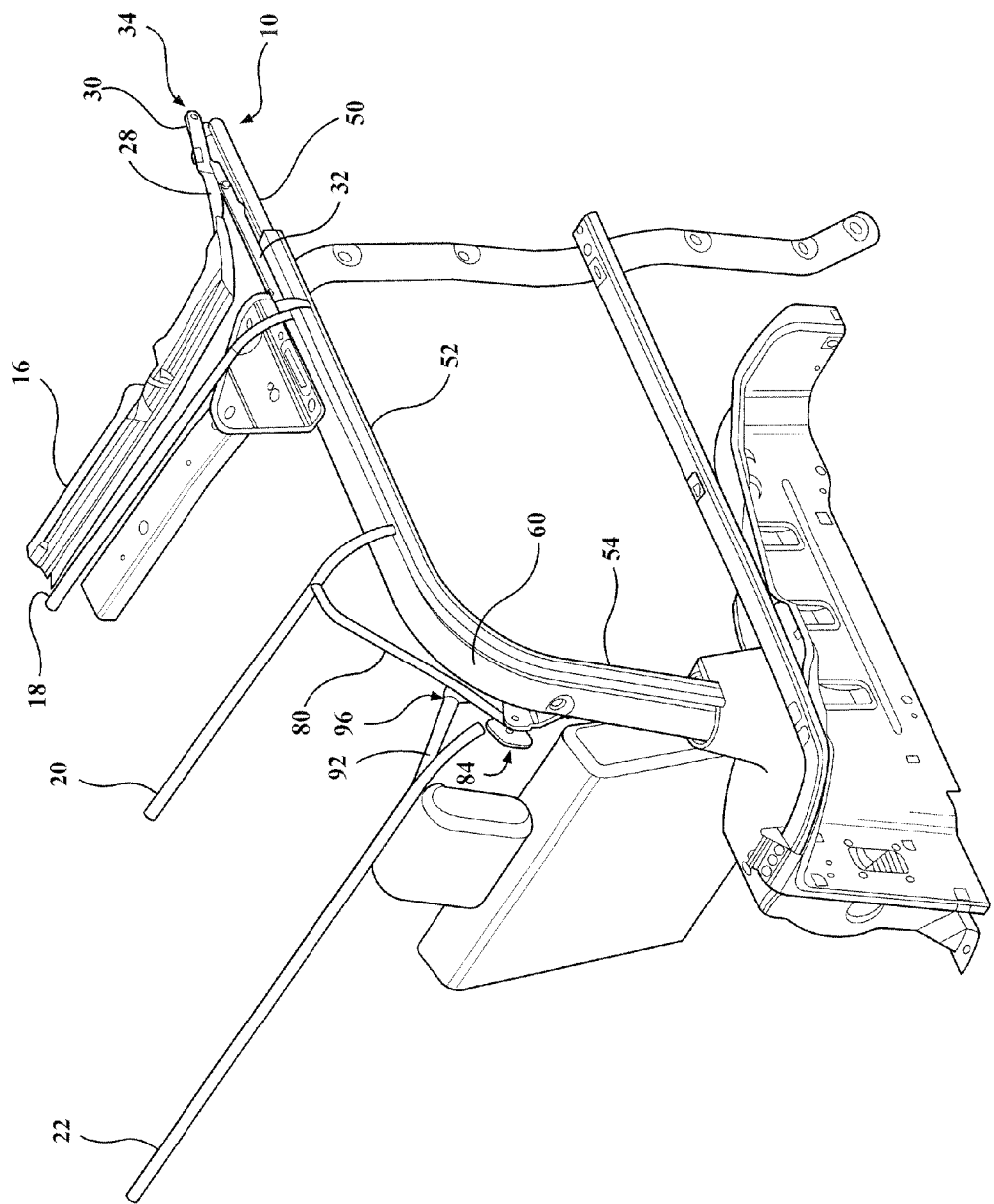
FIG. 7 is an enlarged perspective sectional view of the soft top assembly depicted in FIG. 1 illustrating a first bow in a first stowed position, in accordance with the present invention.
Figure 8:
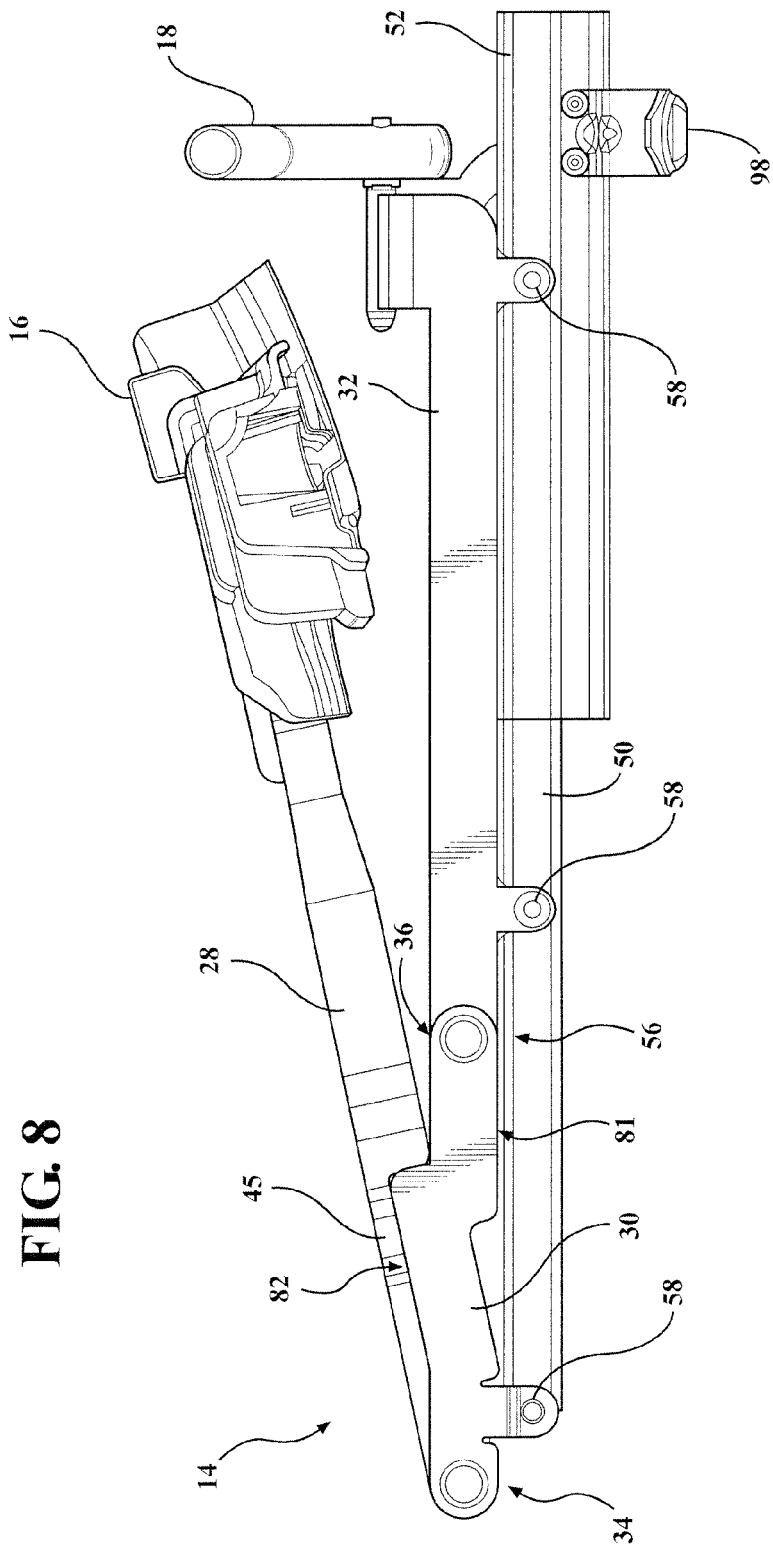
FIG. 8 is an enlarged side elevation view of the soft top assembly depicted in FIG. 2, illustrating a first bow in a first stowed position, in accordance with the with the present invention.
Figure 9:
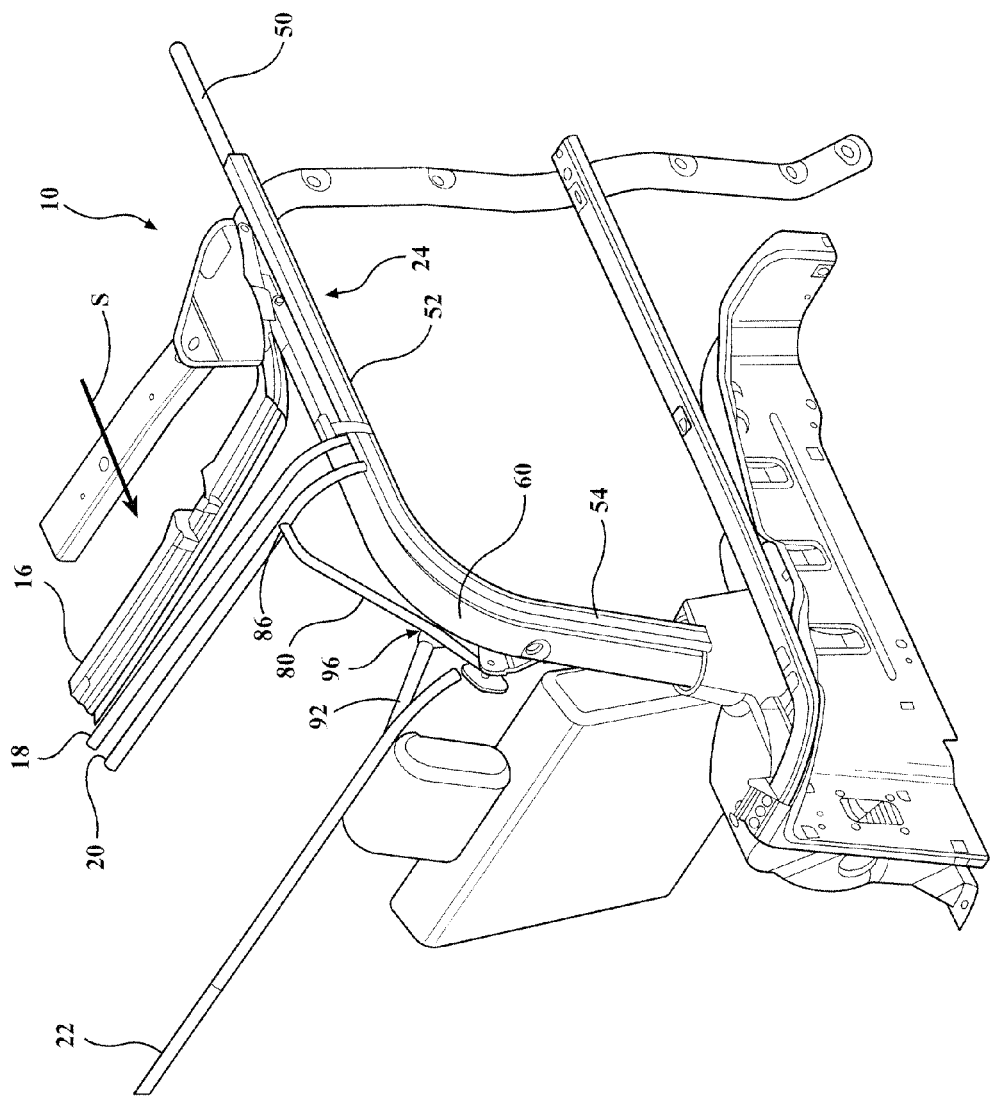
FIG. 9 is an enlarged perspective sectional view of the soft top assembly depicted in FIG. 1 illustrating rearward sliding of the first linkage assembly of the soft top assembly, in accordance with the present invention.
Figure 10:
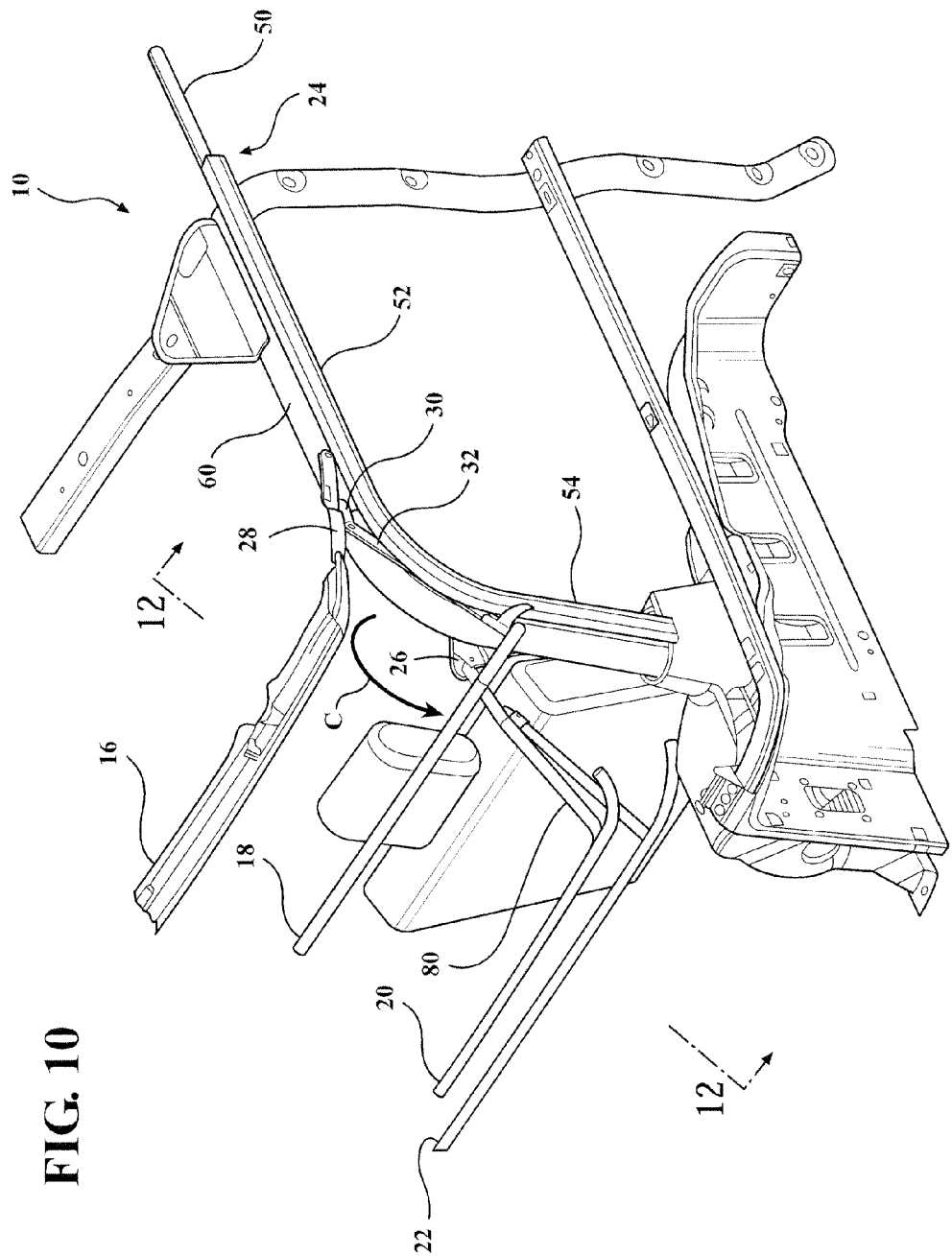
FIG. 10 is an enlarged perspective sectional view of the soft top assembly depicted in FIG. 1 illustrating sliding and rotation of the soft top assembly, in accordance with the present invention.

Referring to FIGS. 1-17 generally, there is provided a soft top assembly, shown generally at 10, that is a sliding and folding soft top assembly, in accordance with the present invention. A frame, generally shown at 12, of the sliding/folding soft top assembly 10 includes a first linkage assembly, generally shown at 14, second linkage assembly, shown generally at 15, a first bow 16, second bow 18, third bow 20, fourth bow 22, first guide track, shown generally at 24, second guide track, shown generally at 25, a first pivot bracket 26, and a second pivot bracket, shown generally at 27, such that the frame 12 supports the cover, not shown for clarity, and allows an operator to selectively move the soft top assembly 10 between a retracted stowed position and a deployed position, as well as a first stowable position (illustrated in FIGS. 7 and 8) where the cover is partially retracted. The soft top assembly 10 is operably configured to allow one operator to more easily move the soft top assembly 10 between the deployed position and retracted stowed position.

The first bow 16, second bow 18, third bow 20 and fourth bow 22 are shown broken along their lengths throughout FIGS. 2-14 for figure clarity and to illustrate that the bows may be any different length suitable for and dependent upon the particular vehicle application. It is understood that the first and second linkage assemblies 14,15 and first and second guide tracks 24,25 can also be any length suitable for and dependent upon the particular application. One such application, for exemplary purposes, is for use with a two door Jeep® sports utility vehicle. It is understood that the second side, toward driver side, of the soft top assembly 10 is substantially a mirror image with like components to the first side, passenger side, depicted throughout the figures.

The first linkage assembly 14 (and corresponding second linkage assembly 15) includes a front link 28, center link 30, rear link 32, a front pivot joint, generally shown at 34, and a rear pivot joint, generally shown at 36. One end of the front link 28 is connected to the first bow 16. The other end of the front link 28 is connected to the front end of the center link 30, creating the front pivot joint 34, using a shoulder rivet 38 extending through an aperture 40 formed in the front link 28 and an aperture 42 formed in the center link 30. The front pivot joint 34 also has bushings 44 that receive the shoulder rivet 38 on both sides of the center link 30.

Figure 1:
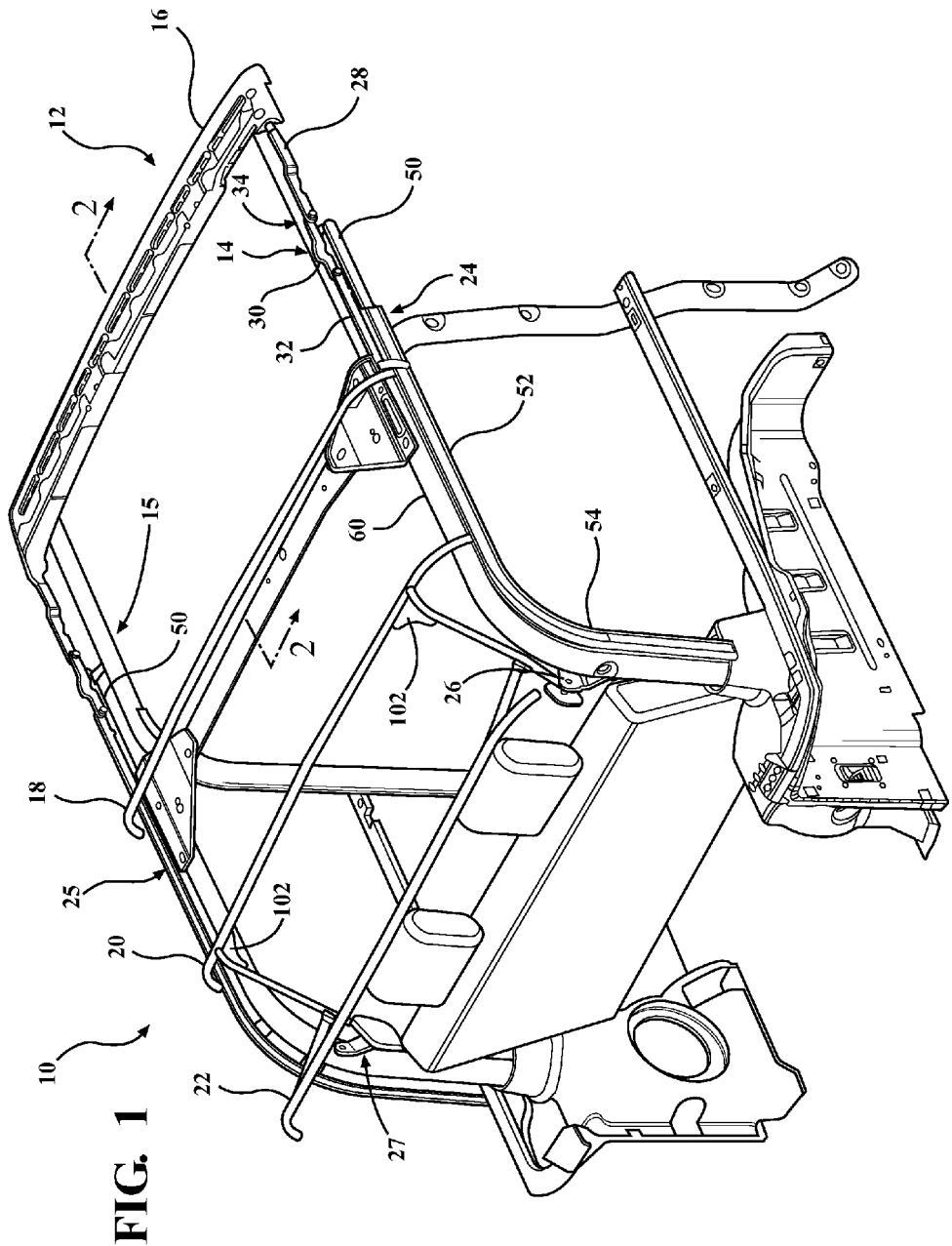
FIG. 1 is a perspective view of the soft top assembly, in accordance with the present invention shown in an environment of use.
Figure 2:
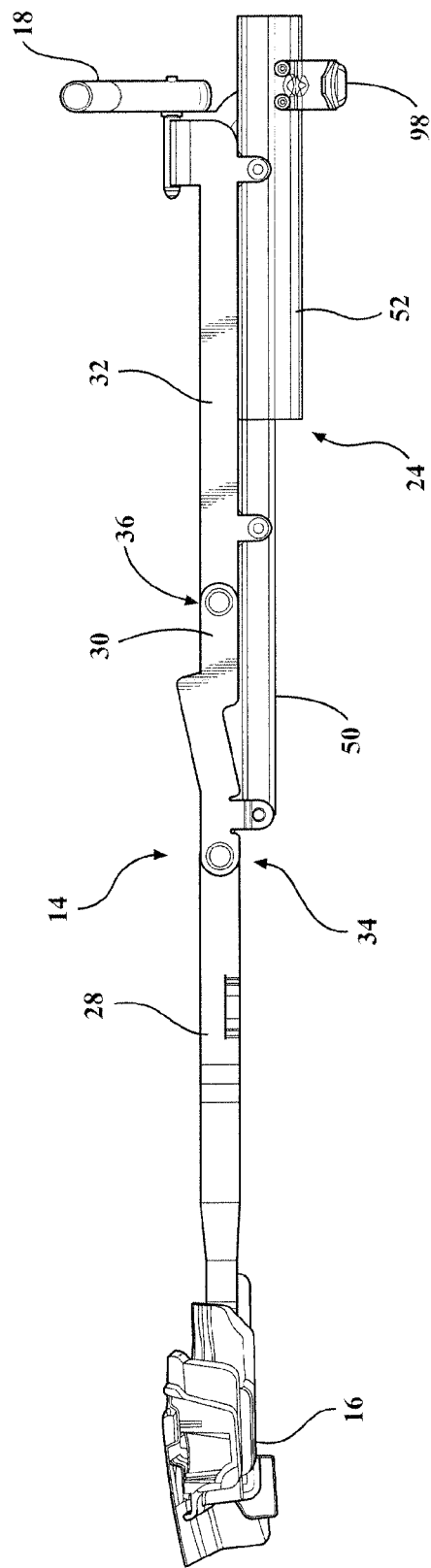
FIG. 2 is an enlarged sectional side elevation view taken along line 2-2 of FIG. 1 of the soft top assembly, in accordance with the present invention.
Figure 3:
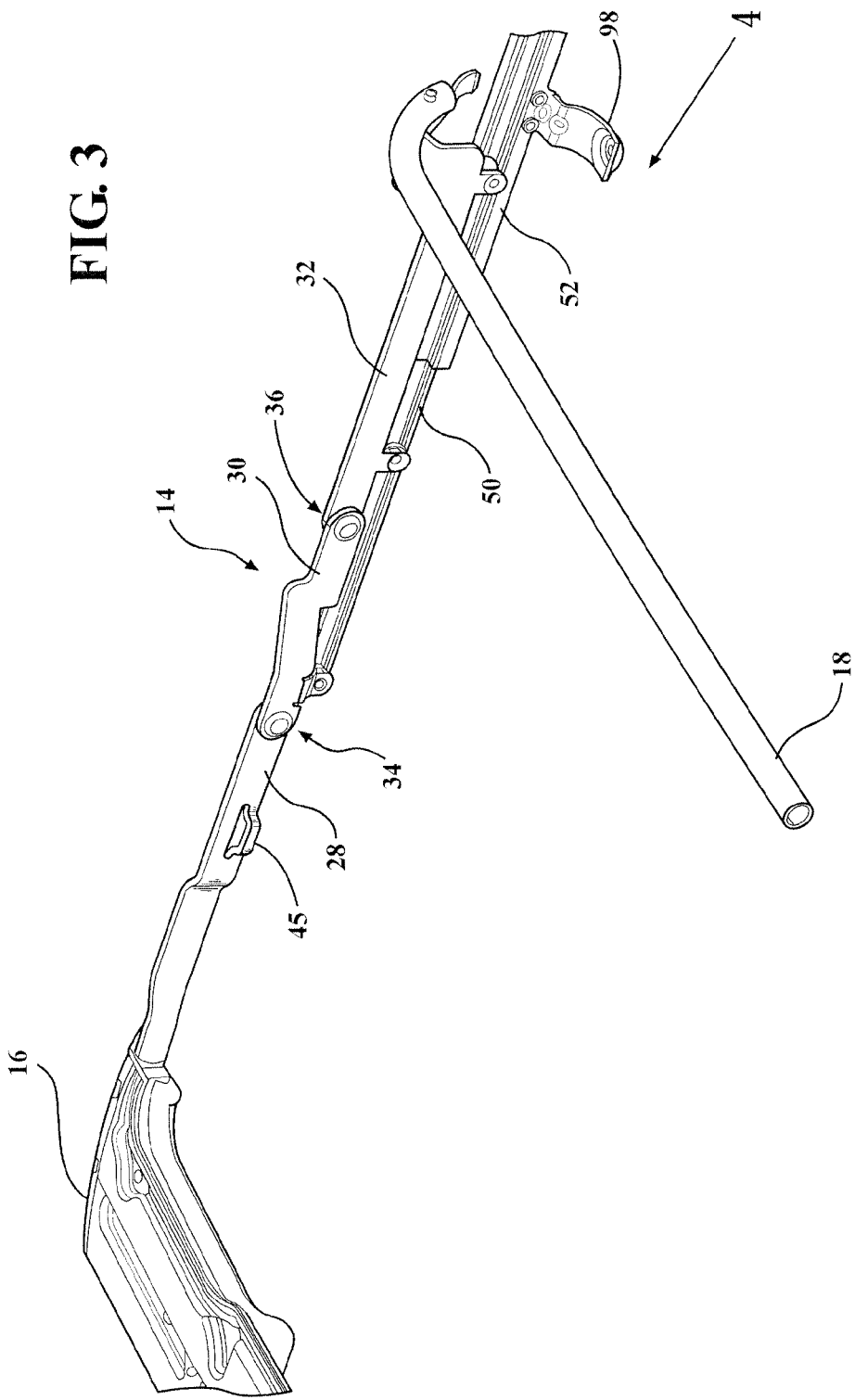
FIG. 3 is an enlarged perspective view taken along line 2-2 of FIG. 1 of the soft top assembly depicted in FIGS. 1-2, in accordance with the present invention.
Figure 4:
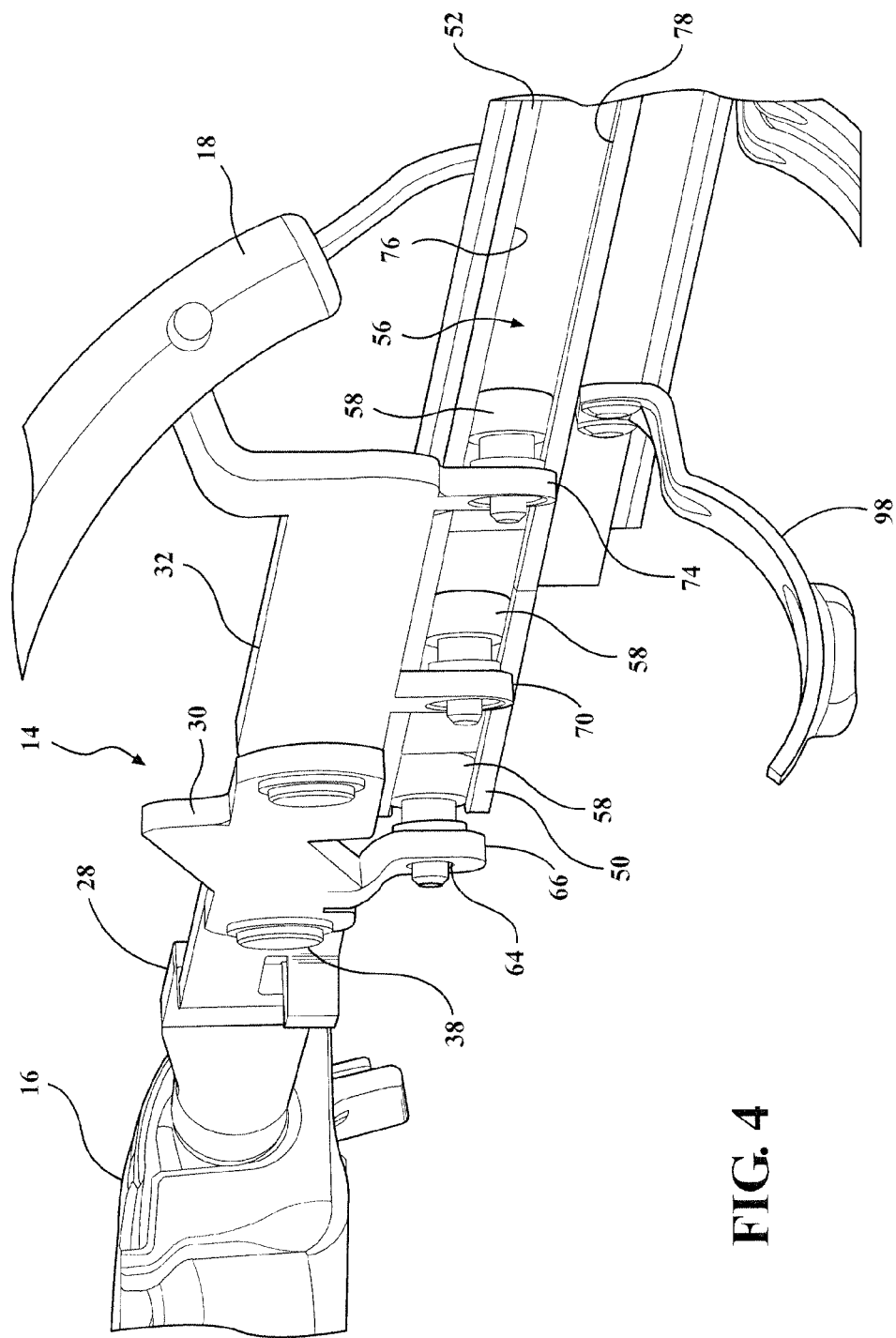
FIG. 4 is an enlarged perspective view as indicated by arrow 4 of FIG. 3 of the soft top assembly depicted in FIGS. 1-3 illustrating a plurality of guide rollers within a first guide track, in accordance with the present invention.
Figure 5:
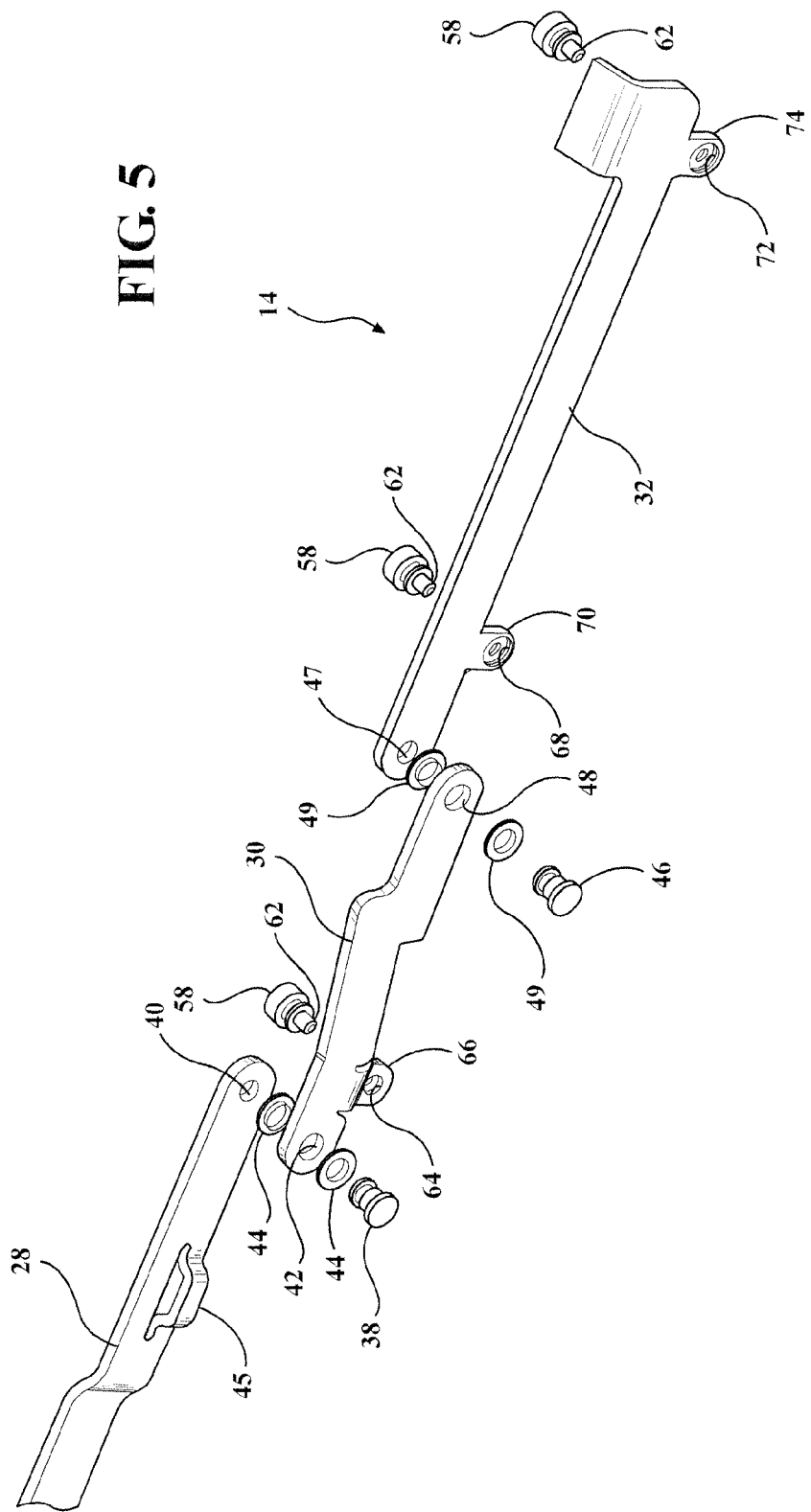
FIG. 5 is an exploded view of a first linkage assembly of the soft top assembly, in accordance with the present invention.
Figure 6:
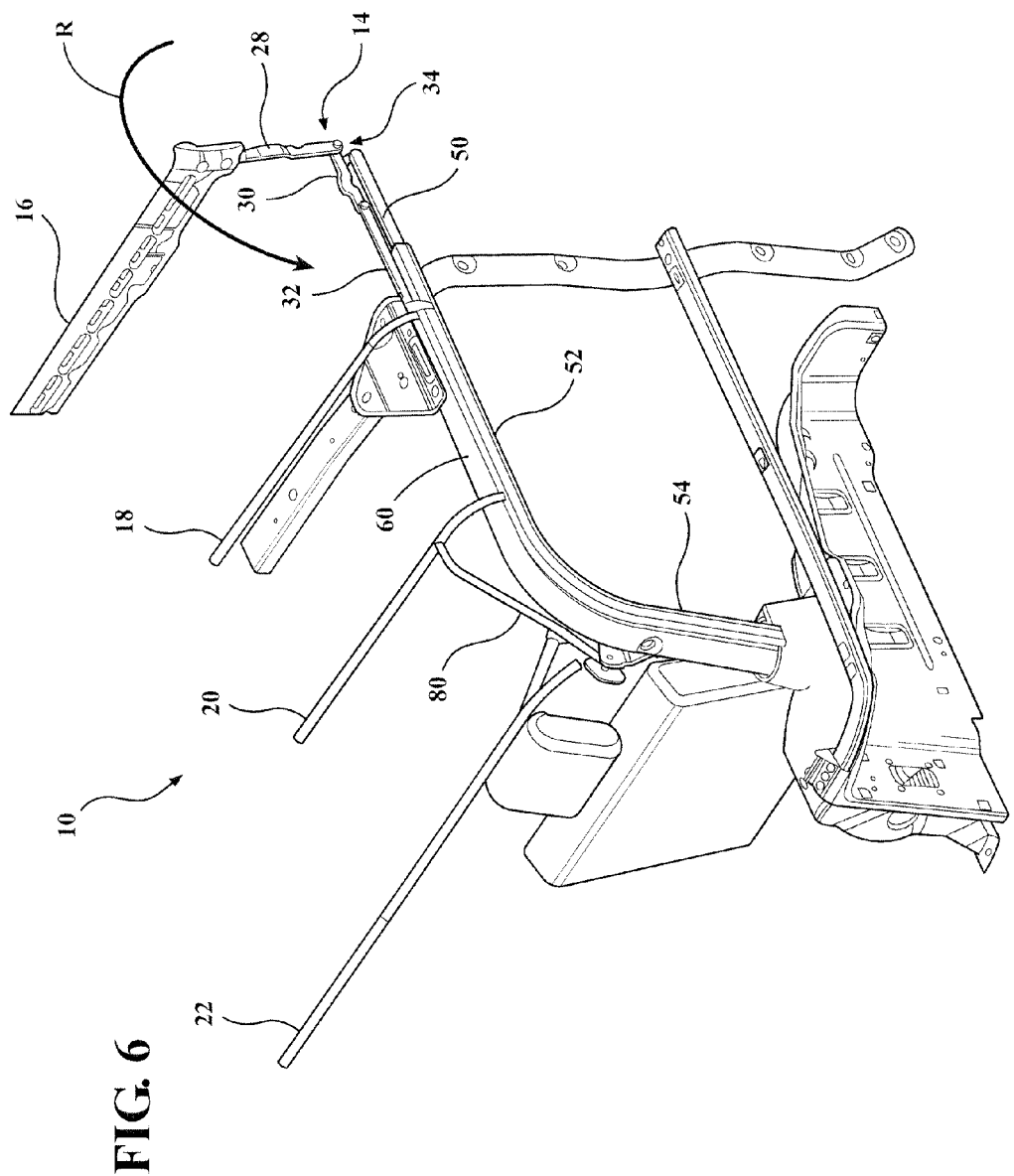
FIG. 6 is an enlarged perspective sectional view of the soft top assembly illustrated in FIG. 1 and as depicted in FIGS. 1-5, illustrating rotation of a first bow, in accordance with the present invention.

The front pivot joint 34 permits rotation, indicated by rotation arrow "R" in FIG. 6, of the front link 28 and first bow 16 in the rearward direction to a first stowed position (e.g., rotated at least 120 degrees and less than 180 degrees from a deployed position where the first bow 16 is attached to the windshield header). The cover folds below the first bow 16 to which it is coupled when the first bow 16 is rotated to the first stowed position thereby exposing the vehicle interior, typically, exposing the driver and front passenger seat area.

The vehicle may be operated with the soft top assembly 10 in this first stowed position by securing the first bow 16 and front link 28 to the center link 30, rear link 32 and/or vehicle structure. A latch mechanism assembly, shown generally at 104, is configured to secure the position of the first and second linkage assemblies 14,15 and prevent undesired sliding of the first and second linkage assemblies 14,15 in the first and second guide tracks 24,25. Additionally, releasable straps or any suitable means for quickly and effectively preventing the first bow 16 and front link 28 from rotating forward can be used.

A stop 45 protrudes from the inner side of the front link 28 of the first linkage assembly 14. The center link 30 is configured to contact the bottom of the protruding stop 45 to control the height and angle of the first bow 16 in the first stowed position making room for the cover. This also facilitates smooth sliding of the first linkage assembly 14 and controls the height of the first bow 16 for clearing the sport/roll bar 60, first and second guide tracks 24,25, as well as any intermediary cross car support structure 100 between the deployed and retracted stowed positions. The center link 30 has a raised portion, generally shown at 82, that is angled upward to an operable height and contacts the stop 45, and a lower portion, generally shown at 81, parallel to a plane of the front of the central link 30.

Figure 11:
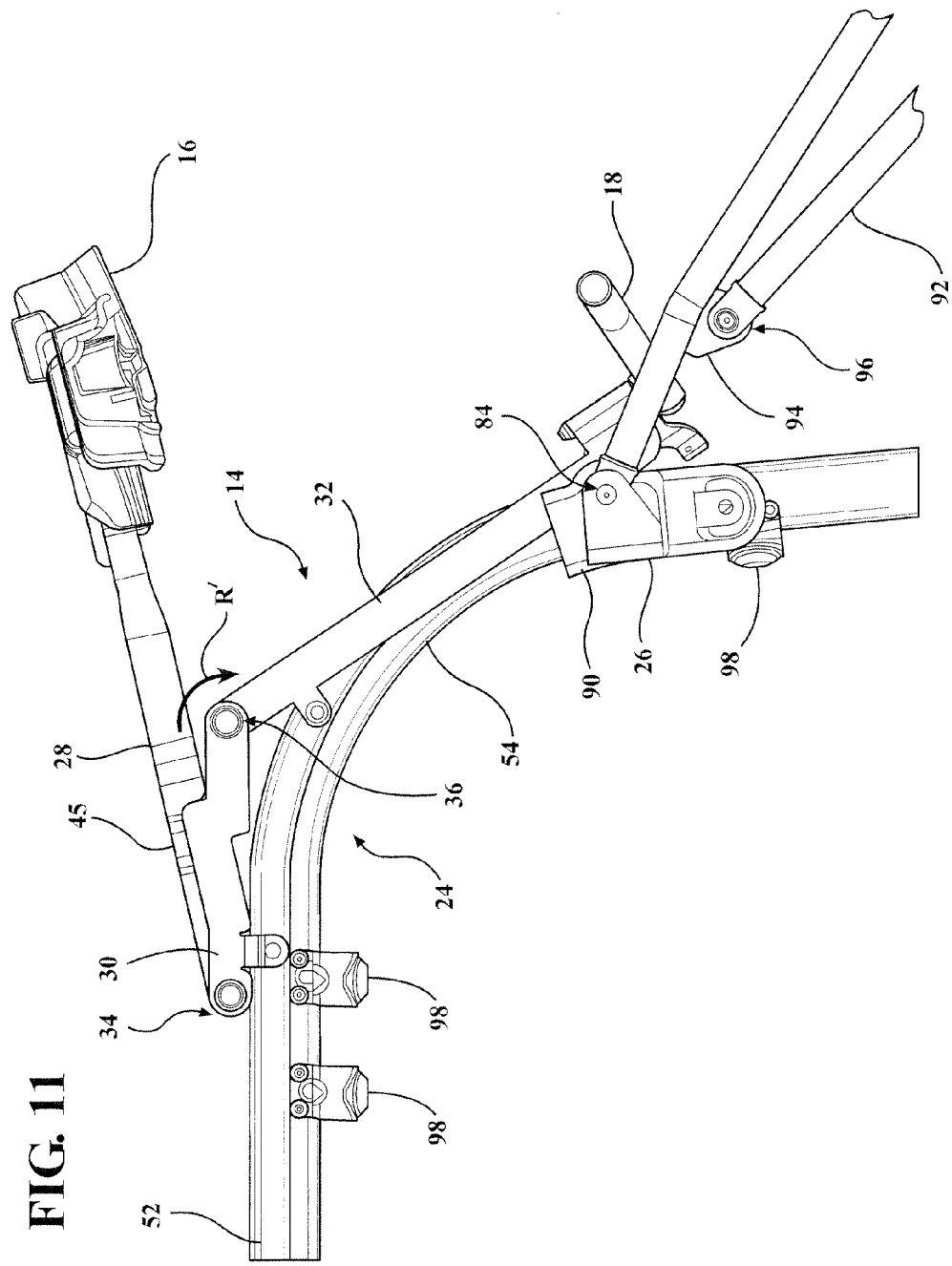
FIG. 11 is an enlarged sectional side elevation view with a sport/roll bar omitted for figure clarity, illustrating further sliding and rotation of the soft top assembly and a first bow clearing a guide track assembly, in accordance with the present invention.
Figure 12:
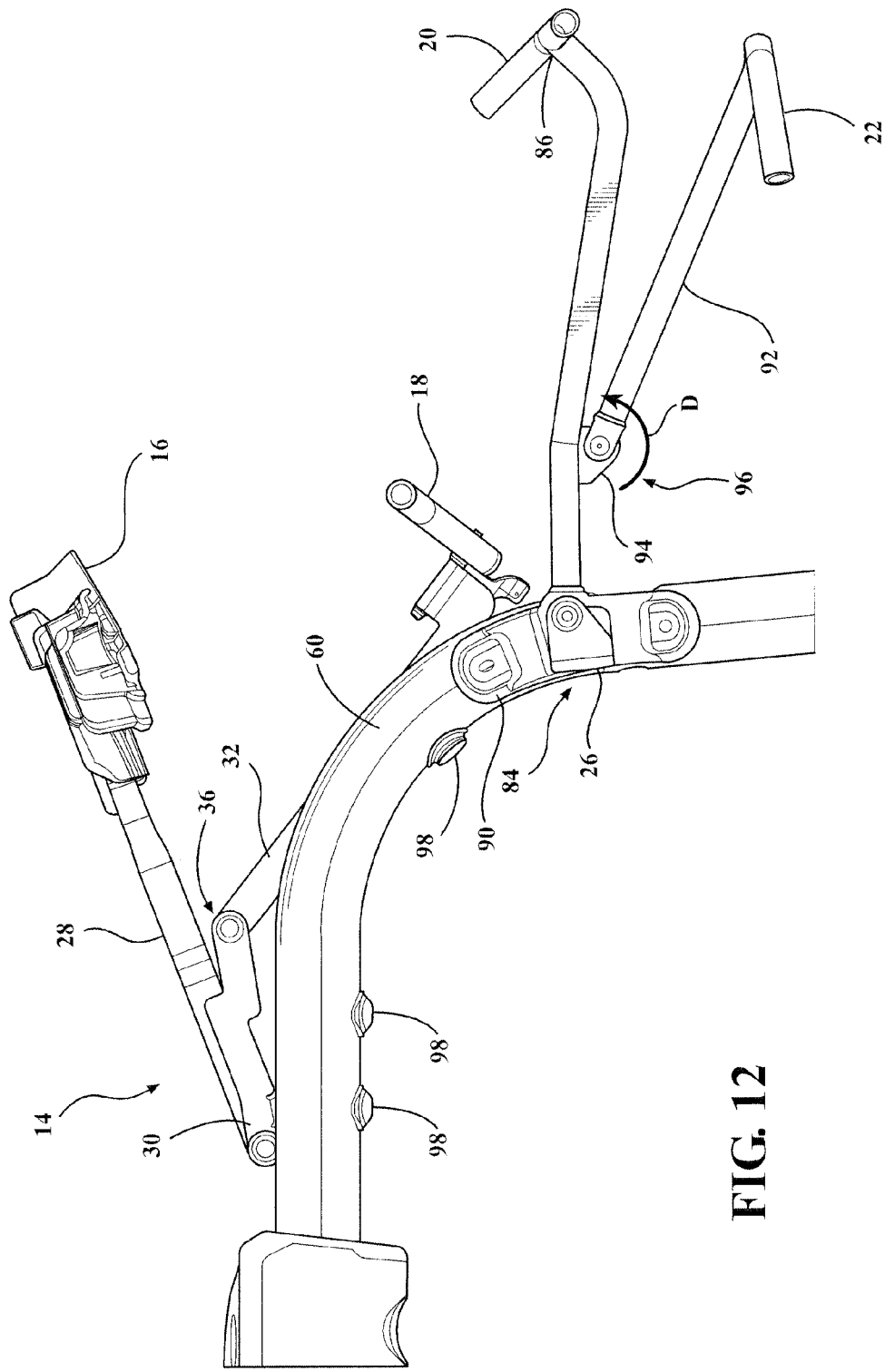
FIG. 12 is an enlarged sectional side elevation view taken along line 12-12 of FIG. 10 of the soft top assembly, in accordance with the present invention.
Figure 13:
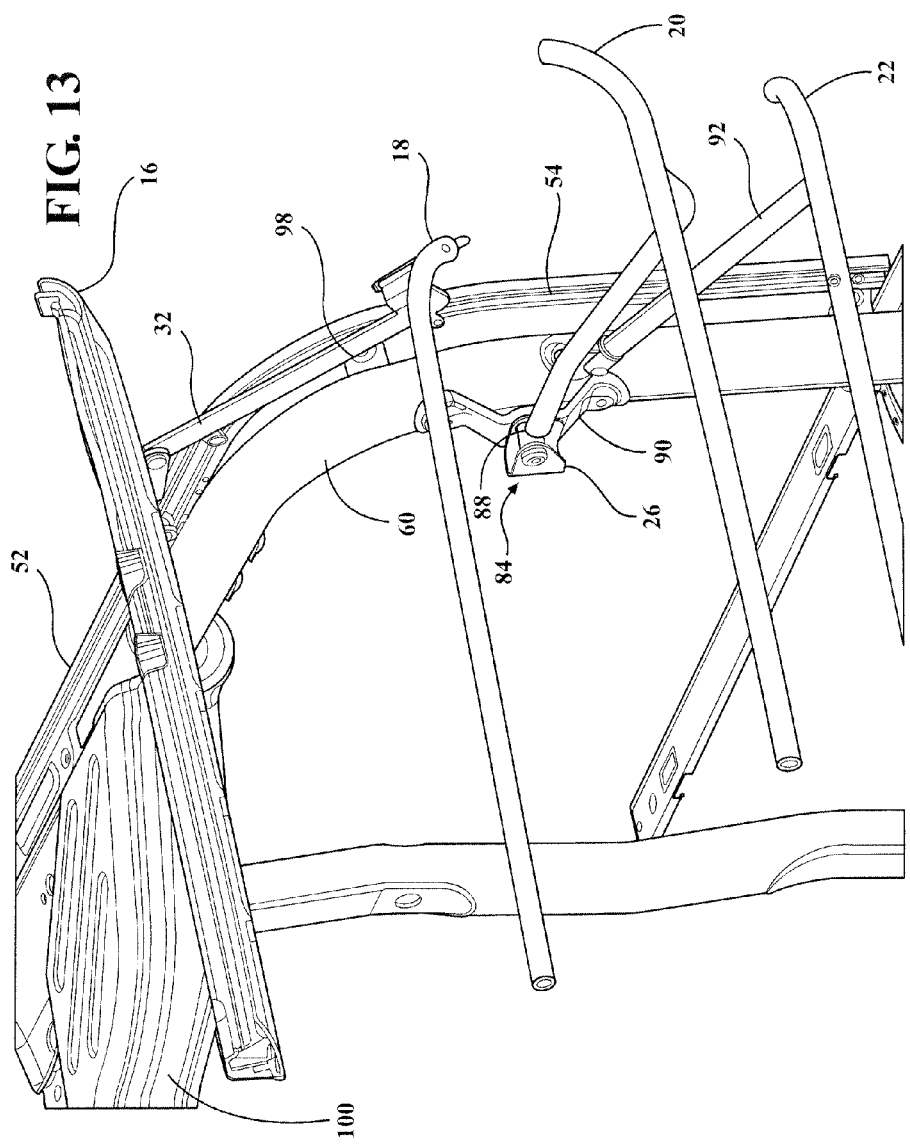
FIG. 13 is a perspective view of FIG. 12, in accordance with the present invention.
Figure 14:
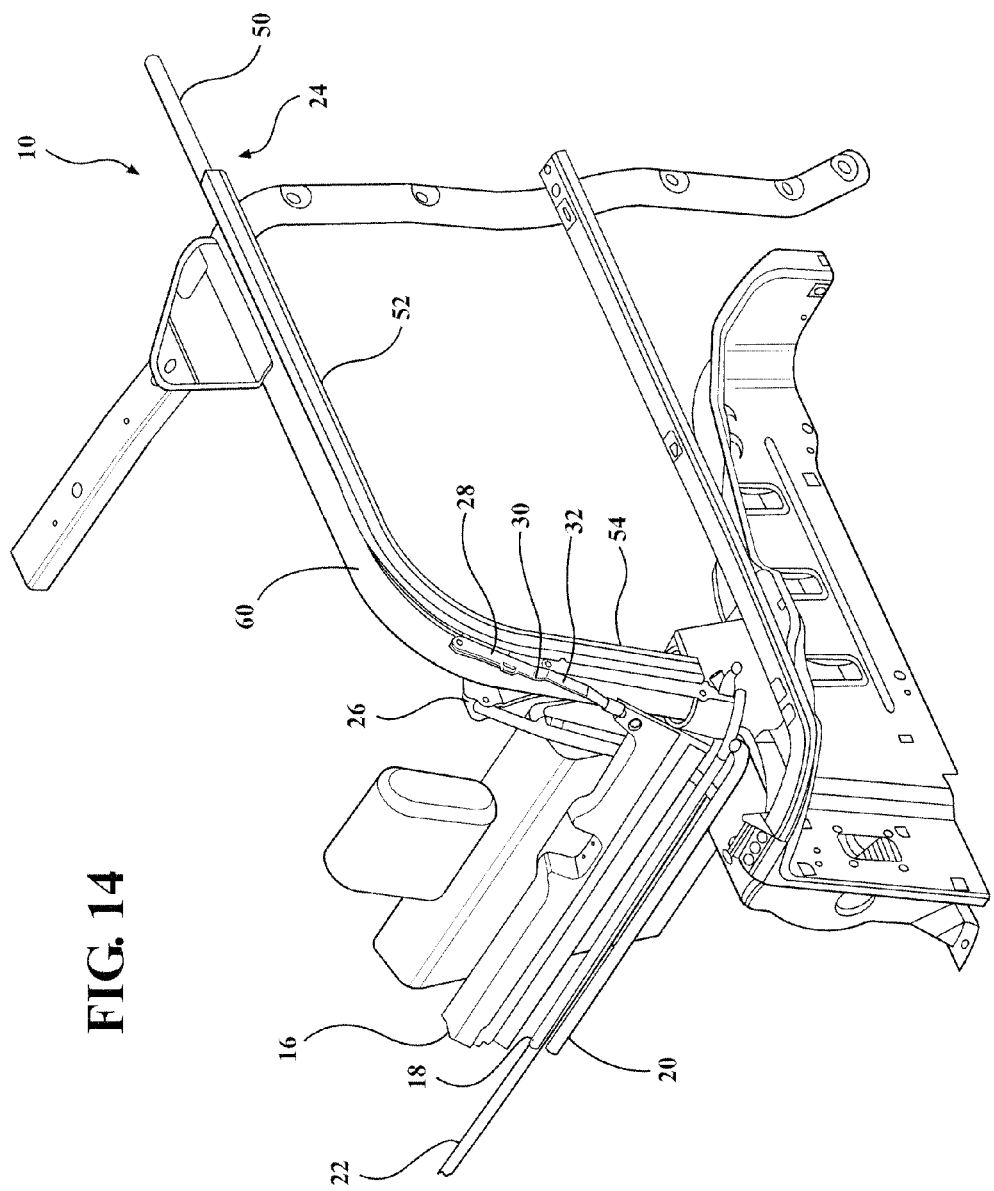
FIG. 14 is an enlarged perspective sectional view of the soft top assembly depicted in FIG. 1 in a retracted stowed position, in accordance with the present.
Figure 15:
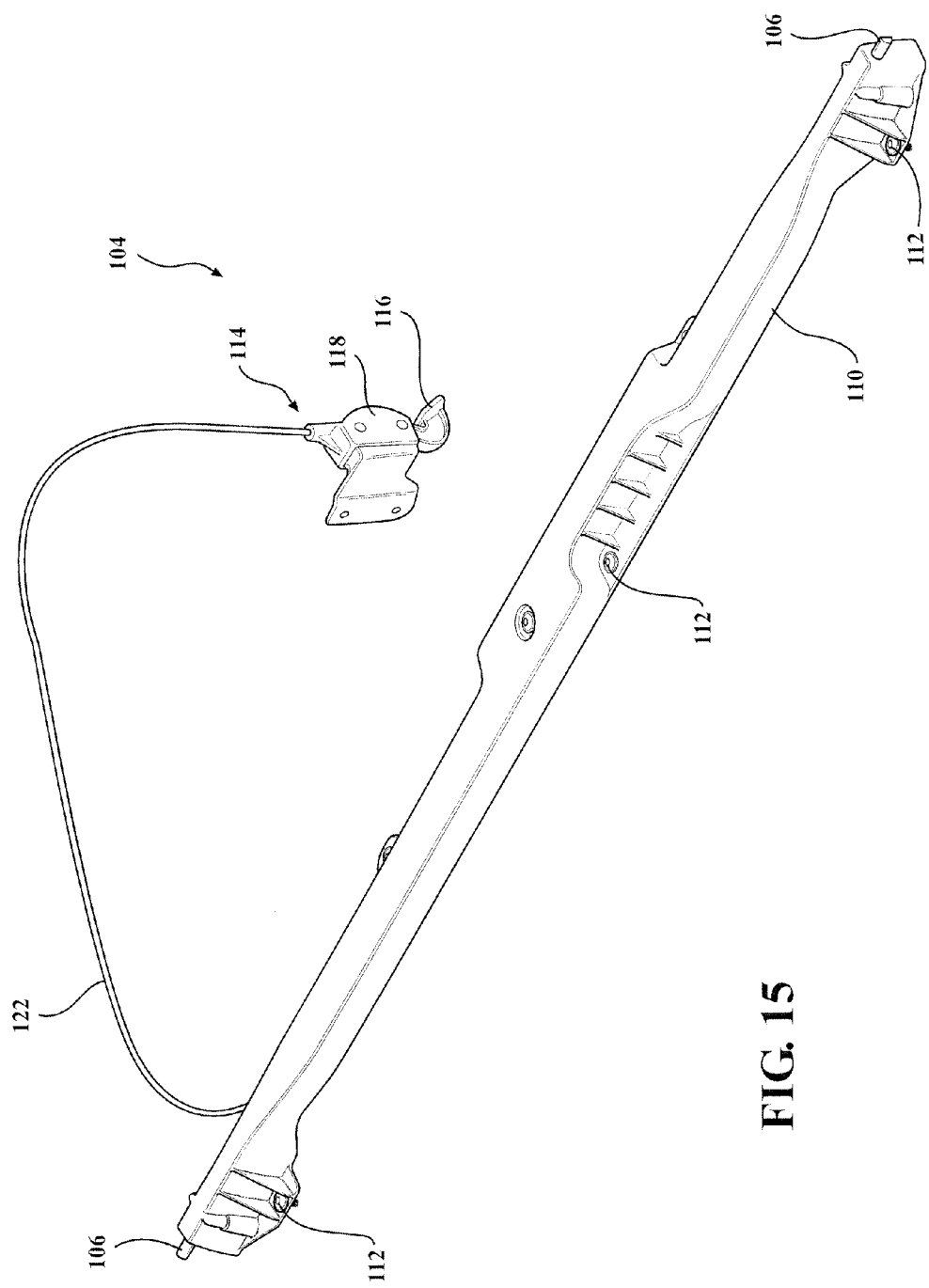
FIG. 15 is a perspective view of a latch mechanism assembly, in accordance with the present invention.
Figure 16:
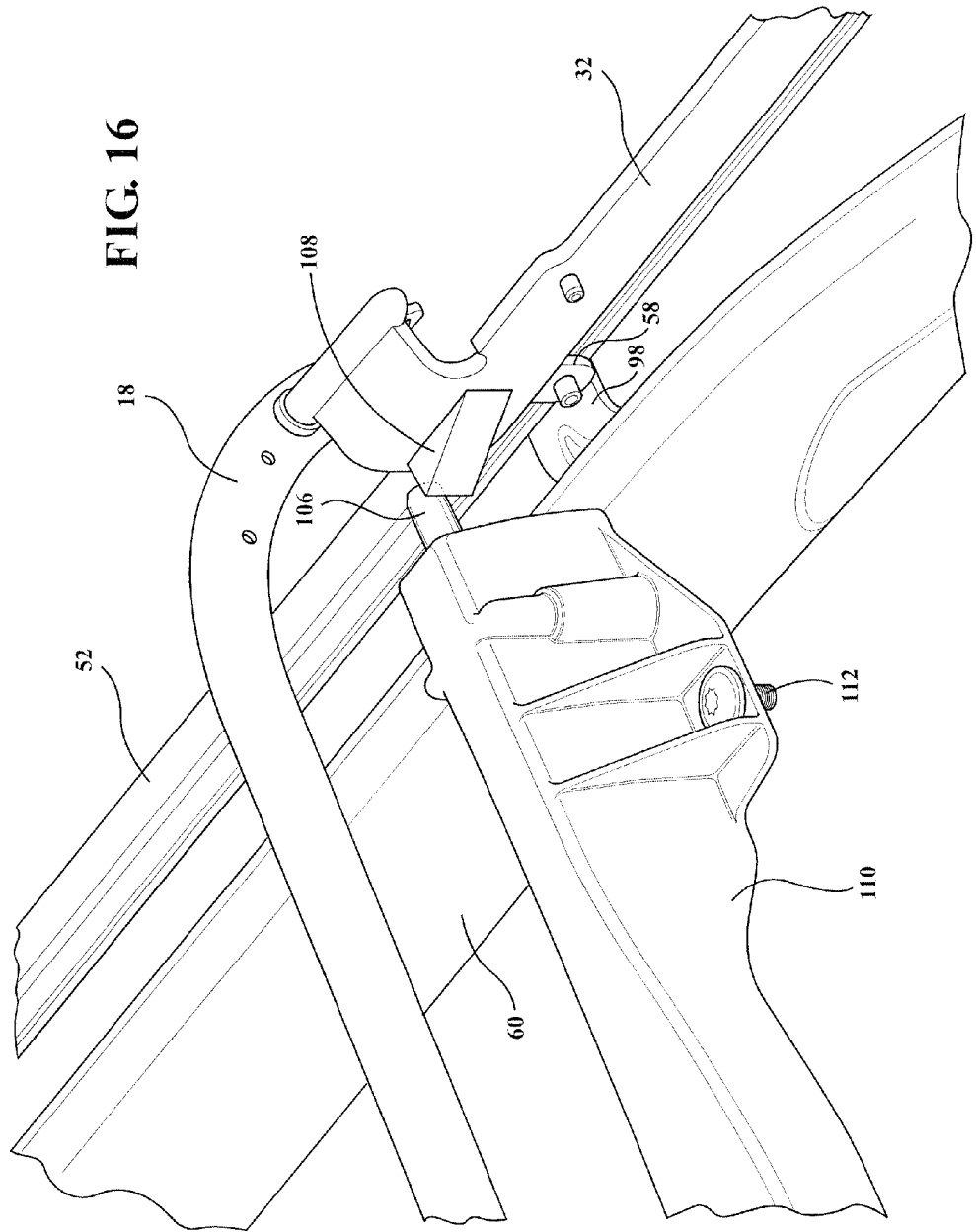
FIG. 16 is a detailed perspective view illustrating one end of the latch mechanism assembly of FIG. 15 engaging a plunger catch of a second linkage assembly of the soft top assembly, in accordance with the present invention.
Figure 17:
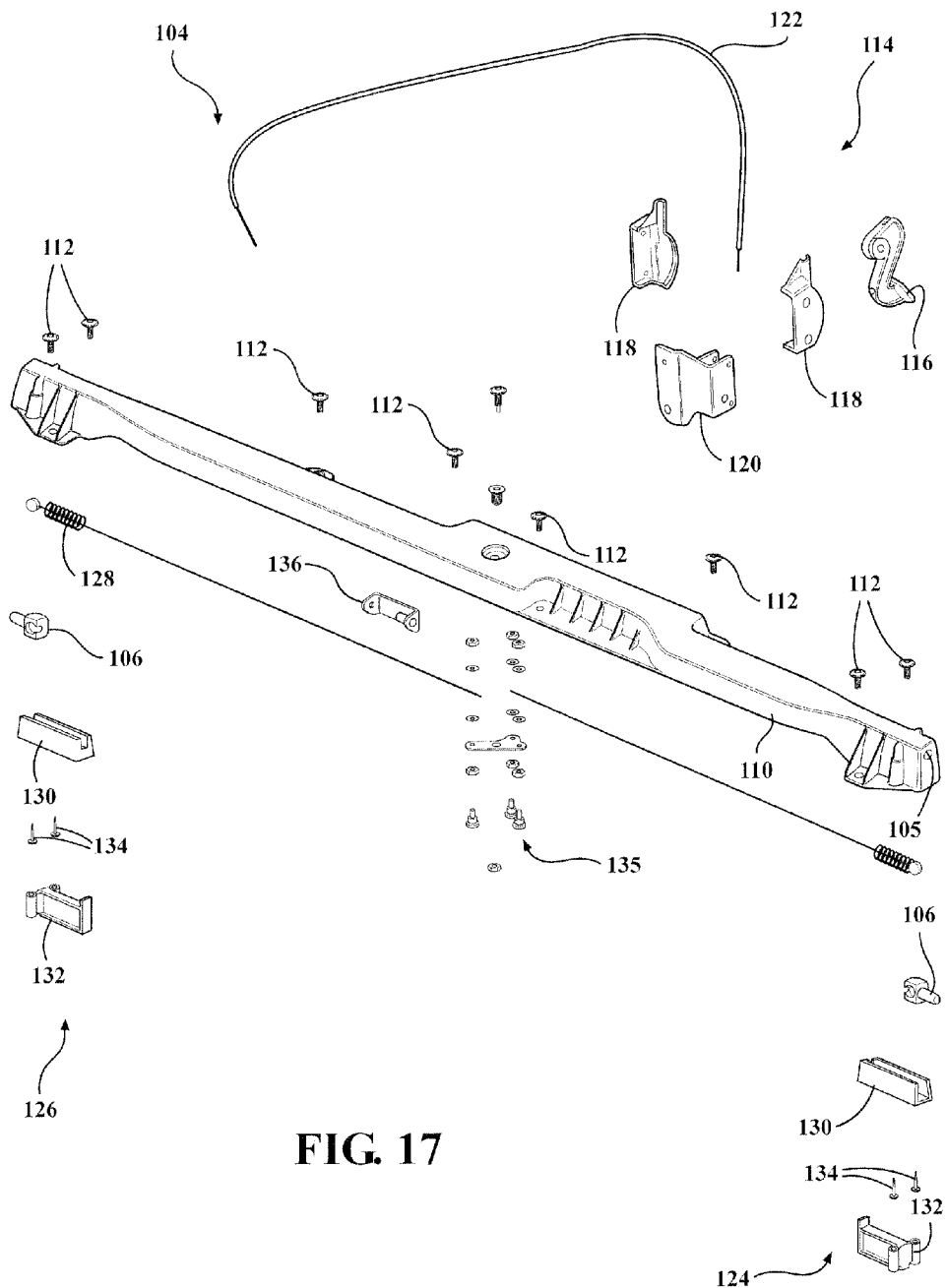
FIG. 17 is an exploded view of the latch mechanism assembly of FIG. 15.

The rearward portion of the rear link 32 is connected to the second bow 18. The front end of the rear link 32 is connected to an end of the center link 30, creating the rear pivot joint 36, using a shoulder rivet 46 extending through an aperture 47 formed in the rear link 32 and an aperture 48 formed in the center link 30. The rear pivot joint 36 also has bushings 49 that receive the shoulder rivet 46 on both sides of the center link 30 adjacent the aperture 47 formed therein. The rear pivot joint 36 permits rotation of the rear link 32 relative to the center link 30 (e.g., downward rotation as illustrated in FIG. 11 indicated by rotation arrow "R", and upward rotation). The front and rear pivot joints 34,36 permit rotation of said rear link 32 and/or center link 30 such that as said first and second linkage assemblies 14,15 slide between said deployed position and/or first stowed position and said retracted stowed position, said rear link 32 and/or center link 30 rotates at said front and/or rear pivot joint 34,36 for traversing a curved area of said first and second guide tracks 24,25 and controlling the height of said first bow 16 to clear the sport/roll bar 60 and first and second guide track 24,25.

The first guide track 24 (and corresponding second guide track 25) includes a front track 50 connected to a center track 52 that is connected to a rear track 54, which when assembled together, provides a continuous track recess, generally shown at 56, for a plurality of guide rollers 58 to smoothly slide rearward and forward within the first guide track 24. Alternatively, the first and second guide track 24,25 sections can be formed as one piece. The front track 50, center track 52 and rear track 54 can be any length suitable for and dependent upon the particular application. Typically, the front track 50 and the center track 52 are located toward the top edge of the vehicle frame spaced an operable amount from the vehicle sport/roll bar 60, while the rear track 54 is spaced an operable amount from the curved and then downward extending portion of the vehicle sport/roll bar 60 toward the rear of the vehicle. The rear track 54 extends behind second row passenger seating and/or the storage compartment area in the rearward area of the vehicle.

The first linkage assembly 14 has the plurality of guide rollers 58 which are configured to slidably couple to the first guide track 24. Likewise, the second linkage assembly 15 has a plurality of guide rollers 58 slidably coupled to the first guide track 25. The plurality of guide rollers 58 simultaneously slide within the track recess 56 of the first guide track 24 and second guide track 25.

Each of the plurality of guide rollers 58 includes a boss and/or bushing with a projecting pin 62 operable for connecting to at last the center and rear links 30,32, respectively. The pin 62 of one of the plurality of guide rollers 58 extends through an aperture 64 formed in a bracket member 66 on the bottom of the center link 30 to couple the guide roller 58 near the forward end of the center link 30. The pin 62 of another one of the plurality of guide rollers 58 extends through an aperture 68 formed in a bracket member 70 on the bottom of the rear link 32 to couple the guide roller 58 toward the forward end of the rear link 32. The pin 62 of yet another one of the plurality of guide rollers 58 extends through an aperture 72 formed in a bracket member 74 on the bottom of the rear link 32 to couple the guide roller 58 toward the rearward end of the rear link 32.

The track recess 56 is generally channel shaped, preferably, channel shaped with a downward projecting lip 76 and an upward projecting lip 78 to help prevent undesirable lateral movement of the plurality of guide rollers 58 including moving laterally out of the track recess 56. This also helps prevent undesirable movement or slop within the track recess 56 to provide a smoother simultaneous sliding of the plurality of guide roller 58 and help prevent shimmying and/or binding when an operator moves the soft top assembly 10 along the first and second guide track 24,25. The soft top assembly 10 is operably configured so as to not allow the plurality of guide rollers 58 to exit the ends of the first and second guide tracks 24,25 when in the deployed or first and second stowed positions.

The latch mechanism 104 is used to secure the position of the first and second linkage assemblies 14,15 in the first and second guide tracks 24,25 using a latch plunger 106 located at each end of the latch mechanism to engage a respective plunger catcher 108. The latch mechanism 104 is a cross car assembly including a housing 110 that is secured to the vehicle structure by a plurality of fasteners 112, most preferably, using a screw type fasteners. The plunger catcher 108 is located adjacent to and protrudes from the rear link 32 of the first and second linkage assemblies 14,15. Most preferably, located adjacent to the rearmost guide roller 58 and/or rearmost end of the rear link 32. The latch mechanism 104 is mounted adjacent to the plunger catcher 108 such that the latch plunger 106 functions as a stop to prevent undesired rearward movement of the first and second linkage assemblies 14,15.

There is further provided a release lever assembly, shown generally at 114, including a release lever 116, two piece housing 118, lever attachment bracket 120, and a release cable 122. The release cable 122 is operably coupled at one end to the release lever 116 and toward the other end to a left hand cable assembly, shown generally at 124, and/or right hand cable assembly shown generally at 126, and cable reaction/crank assembly 135 having a cable reaction bracket 136 located within the housing 110. The release lever 116 is mounted by the attachment bracket 120 to the sport/roll bar 60 below the first pivot bracket 26 or second pivot bracket 27 for convenient use by the operator and to avoid interference with moving components. The release cable 122 is any length suitable operably for affixing to the release lever assembly and any vehicle structure, e.g., sport/roll bar 60, location(s) to prevent interference with vehicle components.

A plunger assembly, shown generally at 126, is located within both ends of the housing 110 such that each plunger 106 extends through an aperture 105 at the distal end of the housing 110 to abut against a respective plunger catcher 108. The plunger assembly 126 includes the plunger 106 coupled to a biasing member 128 of the first and second cable assembly and a plunger housing 132 and a spacer block 132 connected to the plunger housing 130 with fasteners 134.

When the soft top assembly 10 is in the first stowed position, the vehicle may be operated in this position as the latch mechanism 104 secures the position of the first and second linkage assemblies 14,15 in the first and second guide tracks 24,25. The latch mechanism 104 is selectively un-latched or otherwise disengaged from the plunger catcher 108 at the rear link 32 by an operator using the release lever 116 to release the latch mechanism 104 in order to slide the soft top assembly 10 rearward in the first and second guide tracks 24,25.

As the first and second linkage assemblies 14,15 are selectively moved further in the rearward direction (shown as "S" in FIG. 9) in the first and second guide tracks 24,25, the first bow 16 and second bow 18 both move at the same rate toward the retracted stowed position. The second bow 18 is configured to extend cross car and is connected to the upper rearward end of the rear link 32 of the first linkage assembly 14 and second linkage assembly 15. Thus, the first bow 16 is connected to the forward end of the linkage assemblies 14,15 and the second bow 18 is connected to the rearward end of the linkage assemblies 14,15. As can be seen from FIGS. 7 and 9, as the first and second bows 16,18 move rearward the distance between both the first and second bows 16,18 to the third bow 20 is decreasing.

The third bow 20 extends cross car above the top plane of the first and second guide tracks 24,25 when in the deployed position and has curved free end portions located adjacent thereto. A pair of rods 80 extends from the third bow 20 and is coupled to the first pivot bracket 26 and second pivot bracket 27, respectively, where each rod 80 attachment creates a third pivot joint, generally shown at 84. A distal end 86 of each rod 80 is located inward to the curved end portion of the third bow 20 and second distal ends 88 are each pivotably coupled to the first and second pivot brackets 26,27. Each of the first and second pivot brackets 26,27 is connected to an attachment bracket 90 located on the inward side of the sport/roll bars 60 opposite to the rear track 54.

The pair of rods 80 are configured to extend at a generally upward and forward angle from the first and second pivot brackets 26,27 to the third bow 20 when the soft top assembly 10 is in the deployed position and first stowed position. As the soft top assembly 10 moves further toward the retracted stowed position, the pair of rods 80, and therefore the third bow 20, freely rotate about the first and second pivot brackets 26,27, as illustrated by rotational arrow "C" in FIG. 10, into a downward and rearward position. A corner bracket 102 (see FIG. 1) is connected where each rod 80 connects to the third bow 20 for additional strength and rigidity.

The fourth bow 22 extends cross car and has curved free end portions. A pair of second rods 92 is connected to the fourth bow 22 and pivotably coupled to the pair of rods 80 that are connected to the third bow 20. The pair of rods 80 each have a bracket 94 for connecting to the fourth bow 22. Each pivotable connection creates a fourth pivot joint, generally shown at 96. The second pair of rods 92 are configured to extend at a generally upward and rearward angle from the pair of rods 80 to the fourth bow 22 when the soft top assembly 10 is in the deployed position and first stowed position. As the soft top assembly 10 moves further toward the retracted stowed position, causing the pair of rods 80 to freely rotate about the first and second pivot brackets 26,27 to a downward and rearward position, this causes the second pair of rods 92 and therefore the fourth bow 22, to freely rotate at each fourth pivot joint 96, as illustrated by rotational arrow "D" in FIG. 12, to a downward and rearward position.

The first and second guide tracks 24,25 are spaced an operable distance from the sport/roll bar 60 to allow easier and smoother sliding and folding of the soft top assembly 10. The first and second guide tracks 24,25 are connected to the vehicle frame and/or sport/roll bar 60 using a plurality of attachment brackets 98. Optionally, additional attachment devices suitable for securely attaching the soft top assembly 10 a predetermined distance from the vehicle frame and/or sport/roll bar 60 are contemplated.

When operating the soft top assembly 10, an operator can retract the soft top assembly 10 to the fully retracted stowed position by first un-latching the first bow 16 from the windshield header, e.g., un-latching header latches located under the visors. The operator, standing on either side of the vehicle, then rotates the first bow 16 rearwardly about the front pivot joint 34 to fold the first bow 16 back to the first stowed position. The vehicle may be operated in this first stowed position as the position of the first and second linkage assemblies 14,15 is secured in the first and second guide tracks 24,25 by the latch mechanism 104. The stop 45 on the front link 28 controls the height of the front bow 16.

To further retract the soft top assembly 10, an operator uses the release lever 116 to release the latch plungers 106 from the plunger catchers 108 at the rear links 32. When the operator begins sliding the soft top assembly 10 rearward the plurality of guide rollers 58 of the first and second linkage assemblies 24,25 translate along the first and second guide tracks 24,25 moving the first and second bow 16,18 therewith. As the soft top assembly 10 slides rearward the front bow 16 motion is controlled by the first and second guide tracks 24,25 so that the front bow 16 raises and clears the sport/roll bars, which is a significant improvement over conventional assemblies, and clears the first and second guide tracks. The first and second linkage assemblies 14,15 are also operably configured to allow the plurality of guide rollers 58 to smoothly traverse the curve of the first and second guide tracks 24,25 and bows to clear the sport/roll bars.

The third bow and fourth bow will freely rotate about the first and second pivot brackets 26,27 into a downward position. As the first and second linkage assemblies 14,15 move vertically downward along the rear track 54 portion, the first, second, third, and fourth bows are pulled tighter to the vehicle in the retracted stowed position. In the fully retracted stowed position each of the plurality of guide rollers 58 is located within the rear track 54. This eliminates the need for an operator to locate the guide rollers 58 into the first and guide tracks 24,25 when it is desired to move the soft top assembly out of the retracted stowed position. This additionally allows a single operator to more easily slide the soft top assembly 10 into the first stowed and deployed positions.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sliding/folding soft top assembly for a vehicle comprising:
    first and second guide tracks;
    first and second linkage assemblies slidably coupled to said first and second guide tracks, said first and second linkage assemblies including a plurality of guide rollers for moving said first and second linkage assemblies along said first and second guide tracks;
    first and second pivot brackets;
    a first bow connected to said first and second linkage assemblies;
    a second bow coupled to said first and second linkage assemblies;
    a third bow pivotably coupled to said first and second pivot brackets; and
    a fourth bow operably coupled to said third bow;
    said sliding/folding soft top assembly configured to selectively move between a deployed position, first stowed position, and retracted stowed position.

2. The sliding/folding soft top assembly for a vehicle of claim 1, wherein each of said first and second guide tracks further comprises a track recess configured to allow sliding of said first and second linkage assemblies between the deployed position, the first stowed position and retracted stowed position while minimizing lateral movement of said plurality of guide rollers.

3. The sliding/folding soft top assembly for a vehicle of claim 2, wherein said track recess is a channel further comprising a downward projecting lip and/or an upward projecting lip for preventing lateral movement of said plurality of guide rollers out of said track recess.

4. The sliding/folding soft top assembly for a vehicle of claim 1, further comprising a latch mechanism assembly having a pair of plungers configured for selectively securing the position of said first and second linkage assemblies in said first and second guide tracks to allow said vehicle to be operated when said sliding/folding soft top assembly is in said first stowed position.

5. The sliding/folding soft top assembly for a vehicle of claim 1, wherein said first and second linkage assemblies further comprise a center link directly connected to a front link and a rear link.

6. The sliding/folding soft top assembly for a vehicle of claim 5, wherein said center link and rear link further comprise a plurality of guide rollers for selectively sliding said first and second linkage assemblies along said first and second guide tracks.

7. The sliding/folding soft top assembly for a vehicle of claim 5, wherein said center link further comprises a raised portion to contact a stop protruding from said front link for controlling the height of said front bow when in said first stowed position and when moving between said deployed position and retracted stowed position.

8. The sliding/folding soft top assembly for a vehicle of claim 5, wherein said front link is pivotably connected to said center link creating a front pivot joint, and said front link and first bow are rotatable from said deployed position rearward about said front pivot point to said first stowed position.

9. The sliding/folding soft top assembly for a vehicle of claim 5, wherein said rear link is pivotably connected to said center link creating a rear pivot joint such that as said first and second linkage assemblies slide between said deployed position and/or first stowed position and said retracted stowed position, said rear link and/or center link rotates for traversing a curved area of said first and second guide tracks and controlling the height of said first bow.

10. The sliding/folding soft top assembly for a vehicle of claim 1, further comprising a pair of rods connecting said third bow to said first and second pivot brackets, wherein as said first and second linkage assemblies move further toward the retracted stowed position, the pair of rods freely rotate about the first and second pivot brackets to bring said third bow into a downward position.

11. The sliding/folding soft top assembly for a vehicle of claim 1, further comprising a second pair of rods each pivotably coupling said fourth bow to said third bow at a forth pivot joint for rotating said fourth bow between the deployed position and retracted stowed position as the third bow rotates.

12. The sliding/folding soft top assembly for a vehicle of claim 1, further comprising an attachment bracket to connect each of said first and second pivot brackets to an inward facing side of respective sport/roll bars.

13. The sliding/folding soft top assembly for a vehicle of claim 12, further comprising a plurality of attachment brackets for coupling said first and second guide tracks to said sport/roll bars an operable distance from an outward facing side of said sport/roll bars.

14. A sliding/folding soft top assembly for a vehicle comprising:
first and second guide tracks each having a track recess;
first and second linkage assemblies comprising a plurality of guide rollers slidably coupled to said track recess;
first and second pivot brackets coupled to opposing sport/roll bars;
a first bow connected to said first and second linkage assemblies and rotatable to a first stowed position;
a latch mechanism assembly having a pair of plungers for selectively engaging said first and second linkage assemblies to prevent sliding of said first and second linkage assemblies when in said first stowed position;
a second bow connected to said first and second linkage assemblies;
a third bow pivotably coupled to said first and second pivot brackets; and
a fourth bow pivotably coupled to said third bow;
said sliding/folding soft top assembly configured to move between a deployed position, said first stowed position, and retracted stowed position using said first and second linkage assemblies and first and second pivot brackets.

15. The sliding/folding soft top assembly for a vehicle of claim 14, wherein said track recess is channel shaped and further comprises a downward projecting lip and/or an upward projecting lip for preventing lateral movement of said plurality of guide rollers out of said track recess.

16. The sliding/folding soft top assembly for a vehicle of claim 14, wherein said third and fourth bows are configured to freely rotate about the first and second pivot brackets between said deployed position and retracted stowed position.

17. The sliding/folding soft top assembly for a vehicle of claim 14, further comprising a pair of rods to connect said third bow to said first and second pivot brackets each creating a third pivot joint, such that said third and fourth bows freely rotate about the first and second pivot brackets to coincide with sliding of said first and second linkage assemblies between said deployed position and said retracted position.

18. The sliding/folding soft top assembly for a vehicle of claim 17, further comprising a second pair of rods to connect said fourth bow to said pair of rods each creating a fourth pivot joint.

19. A sliding/folding soft top assembly for a vehicle comprising:
first and second guide tracks each having a track recess;
first and second linkage assemblies comprising a plurality of guide rollers slidably coupled to said track recess;
first and second pivot brackets coupled to opposing sport/roll bars;
a first bow connected to said first and second linkage assemblies and rotatable to a first stowed position;
a latch mechanism assembly having a pair of plungers for selectively engaging said first and second linkage assemblies to prevent sliding of said first and second linkage assemblies when in said first stowed position;
a second bow connected to said first and second linkage assemblies;
a third bow pivotably coupled to said first and second pivot brackets; and
a fourth bow pivotably coupled to said third bow, wherein said third and fourth bows are configured to freely rotate about the first and second pivot brackets; and
wherein said sliding/folding soft top assembly is configured to move between a deployed position, said first stowed position, and retracted stowed position.

* * * * *